United States Patent
Maier

(10) Patent No.: US 8,267,437 B2
(45) Date of Patent: Sep. 18, 2012

(54) ACCESS COVER FOR PRESSURIZED CONNECTOR SPOOL

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 639 days.

(21) Appl. No.: 12/441,911

(22) PCT Filed: Sep. 25, 2007

(86) PCT No.: PCT/US2007/079348
§ 371 (c)(1),
(2), (4) Date: Apr. 15, 2009

(87) PCT Pub. No.: WO2008/039731
PCT Pub. Date: Apr. 3, 2008

(65) Prior Publication Data
US 2010/0074768 A1    Mar. 25, 2010

Related U.S. Application Data

(60) Provisional application No. 60/826,801, filed on Sep. 25, 2006.

(51) Int. Cl.
*F16L 23/00* (2006.01)
(52) U.S. Cl. ......... 285/367; 285/411; 285/414; 285/419
(58) Field of Classification Search .................. 285/368, 285/412, 414–415, 419, 367, 410–411; 417/360–361, 422, 423.14; 464/170, 172
See application file for complete search history.

(56) References Cited

U.S. PATENT DOCUMENTS

| 625,941 | A | * | 5/1899 | Albee ..................... 137/625.44 |
| 815,812 | A |  | 3/1906 | Gow |
| 1,057,613 | A |  | 4/1913 | Baldwin |
| 1,061,656 | A |  | 5/1913 | Black |
| 1,072,896 | A | * | 9/1913 | Sinclair ......................... 285/114 |
| 1,480,775 | A |  | 1/1924 | Marien |
| 1,622,768 | A |  | 3/1927 | Cook et al. |
| 1,642,454 | A |  | 9/1927 | Malmstrom |
| 2,006,244 | A |  | 6/1935 | Kopsa |

(Continued)

FOREIGN PATENT DOCUMENTS

CA    2647511    10/2007

(Continued)

OTHER PUBLICATIONS

International Search Report of the International Searching Authority for Patent Cooperation Treaty Application No. PCT/US2007/079348, dated Apr. 11, 2008, pp. 1-2.

(Continued)

*Primary Examiner* — Aaron Dunwoody
*Assistant Examiner* — Fannie Kee
(74) *Attorney, Agent, or Firm* — Edmonds & Nolte, PC

(57) ABSTRACT

A connector spool for connecting a compressor casing to a drive casing of an industrial compression system includes a spool body having a substantially cylindrical shape. The body has a first end coupled to the compressor casing and a second end coupled to the drive casing, and the body defines an interior region. Access ports are formed in the body for providing access to the interior region, and a hoop-shaped pressurized member covers the access ports.

20 Claims, 3 Drawing Sheets

U.S. PATENT DOCUMENTS

| | | |
|---|---|---|
| 2,300,766 A | 11/1942 | Baumann |
| 2,328,031 A | 8/1943 | Risley |
| 2,345,437 A | 3/1944 | Tinker |
| 2,602,462 A | 7/1952 | Barrett |
| 2,811,303 A | 10/1957 | Ault et al. |
| 2,836,117 A | 5/1958 | Lankford |
| 2,857,850 A * | 10/1958 | Tsiguloff ..................... 417/422 |
| 2,868,565 A | 1/1959 | Suderow |
| 2,897,917 A | 8/1959 | Hunter |
| 2,932,360 A | 4/1960 | Hungate |
| 2,954,841 A | 10/1960 | Reistle |
| 3,044,657 A | 7/1962 | Horton |
| 3,191,364 A | 6/1965 | Sylvan |
| 3,198,214 A | 8/1965 | Lorenz |
| 3,204,696 A | 9/1965 | De Priester et al. |
| 3,213,794 A | 10/1965 | Adams |
| 3,220,245 A | 11/1965 | Van Winkle |
| 3,273,325 A | 9/1966 | Gerhold |
| 3,352,577 A | 11/1967 | Medney |
| 3,395,511 A | 8/1968 | Ernst |
| 3,420,434 A | 1/1969 | Swearingen |
| 3,431,747 A | 3/1969 | Hasheimi et al. |
| 3,454,163 A | 7/1969 | Read |
| 3,487,432 A | 12/1969 | Jenson |
| 3,490,209 A | 1/1970 | Fernandes et al. |
| 3,500,614 A | 3/1970 | Soo |
| 3,578,342 A | 5/1971 | Welch |
| 3,628,812 A | 12/1971 | Larraide et al. |
| 3,672,733 A | 6/1972 | Arsenius et al. |
| 3,814,486 A | 6/1974 | Schurger |
| 3,829,179 A | 8/1974 | Kurita et al. |
| 3,874,194 A * | 4/1975 | Filepp et al. ................... 464/154 |
| 3,915,673 A | 10/1975 | Tamai et al. |
| 3,975,123 A | 8/1976 | Schibbye |
| 4,033,647 A | 7/1977 | Beavers |
| 4,059,364 A | 11/1977 | Andersen et al. |
| 4,078,809 A | 3/1978 | Garrick et al. |
| 4,087,261 A | 5/1978 | Hays |
| 4,103,899 A | 8/1978 | Turner |
| 4,112,687 A | 9/1978 | Dixon |
| 4,117,359 A | 9/1978 | Wehde |
| 4,135,542 A | 1/1979 | Chisholm |
| 4,141,283 A | 2/1979 | Swanson et al. |
| 4,146,261 A | 3/1979 | Edmaier et al. |
| 4,165,622 A | 8/1979 | Brown, Jr. |
| 4,174,925 A | 11/1979 | Pfenning et al. |
| 4,182,480 A | 1/1980 | Theyse et al. |
| 4,197,990 A | 4/1980 | Carberg et al. |
| 4,205,927 A | 6/1980 | Simmons |
| 4,227,373 A | 10/1980 | Amend et al. |
| 4,258,551 A | 3/1981 | Ritzi |
| 4,259,045 A | 3/1981 | Teruyama |
| 4,278,200 A | 7/1981 | Gunnewig |
| 4,298,311 A | 11/1981 | Ritzi |
| 4,333,748 A | 6/1982 | Erickson |
| 4,334,592 A | 6/1982 | Fair |
| 4,336,693 A | 6/1982 | Hays et al. |
| 4,339,923 A | 7/1982 | Hays et al. |
| 4,347,900 A | 9/1982 | Barrington |
| 4,363,608 A | 12/1982 | Mulders |
| 4,374,583 A | 2/1983 | Barrington |
| 4,375,975 A | 3/1983 | McNicholas |
| 4,382,804 A | 5/1983 | Mellor |
| 4,384,724 A | 5/1983 | Derman et al. |
| 4,391,102 A | 7/1983 | Studhalter et al. |
| 4,396,361 A | 8/1983 | Fraser |
| 4,432,470 A | 2/1984 | Sopha |
| 4,438,638 A | 3/1984 | Hays et al. |
| 4,441,322 A | 4/1984 | Ritzi |
| 4,442,925 A | 4/1984 | Fukushima et al. |
| 4,453,893 A | 6/1984 | Hutmaker |
| 4,463,567 A | 8/1984 | Amend et al. |
| 4,468,234 A | 8/1984 | McNicholas |
| 4,471,795 A | 9/1984 | Linhardt |
| 4,477,223 A | 10/1984 | Giroux |
| 4,502,839 A | 3/1985 | Maddox et al. |
| 4,511,309 A | 4/1985 | Maddox |
| 4,531,888 A | 7/1985 | Buchelt |
| 4,536,134 A | 8/1985 | Huiber |
| 4,541,531 A | 9/1985 | Brule |
| 4,541,607 A | 9/1985 | Hotger |
| 4,573,527 A | 3/1986 | McDonough |
| 4,574,815 A | 3/1986 | West et al. |
| 4,648,806 A | 3/1987 | Alexander |
| 4,687,017 A | 8/1987 | Danko et al. |
| 4,737,081 A | 4/1988 | Nakajima et al. |
| 4,752,185 A | 6/1988 | Butler et al. |
| 4,807,664 A | 2/1989 | Wilson et al. |
| 4,813,495 A | 3/1989 | Leach |
| 4,821,737 A | 4/1989 | Nelson |
| 4,826,403 A | 5/1989 | Catlow |
| 4,830,331 A | 5/1989 | Vindum |
| 4,832,709 A | 5/1989 | Nagyszalanczy |
| 4,854,826 A * | 8/1989 | Kleineisel ..................... 417/269 |
| 4,904,284 A | 2/1990 | Hanabusa |
| 4,984,830 A | 1/1991 | Saunders |
| 5,007,328 A | 4/1991 | Otterman |
| 5,024,585 A | 6/1991 | Kralovec |
| 5,043,617 A | 8/1991 | Rostron |
| 5,044,701 A | 9/1991 | Watanabe et al. |
| 5,045,046 A | 9/1991 | Bond |
| 5,054,995 A | 10/1991 | Kaseley et al. |
| 5,064,452 A | 11/1991 | Yano et al. |
| 5,080,137 A | 1/1992 | Adams |
| 5,190,440 A | 3/1993 | Maier et al. |
| 5,202,024 A | 4/1993 | Andersson et al. |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,246,346 A | 9/1993 | Schiesser |
| 5,285,123 A | 2/1994 | Kataoka et al. |
| 5,306,051 A | 4/1994 | Loker et al. |
| 5,337,779 A | 8/1994 | Fukuhara |
| 5,378,121 A | 1/1995 | Hackett |
| 5,385,446 A | 1/1995 | Hays |
| 5,421,708 A | 6/1995 | Utter |
| 5,443,581 A | 8/1995 | Malone |
| 5,484,521 A | 1/1996 | Kramer |
| 5,496,394 A | 3/1996 | Nied |
| 5,500,039 A | 3/1996 | Mori et al. |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhrner et al. |
| 5,542,831 A | 8/1996 | Scarfone |
| 5,569,018 A * | 10/1996 | Mannava et al. .............. 415/200 |
| 5,575,309 A | 11/1996 | Connell |
| 5,585,000 A | 12/1996 | Sassi |
| 5,605,172 A | 2/1997 | Schubert et al. |
| 5,628,623 A | 5/1997 | Skaggs |
| 5,634,492 A | 6/1997 | Steinruck et al. |
| 5,640,472 A | 6/1997 | Meinzer et al. |
| 5,641,280 A | 6/1997 | Timuska |
| 5,653,347 A | 8/1997 | Larsson |
| 5,664,420 A | 9/1997 | Hays |
| 5,682,759 A | 11/1997 | Hays |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,703,424 A | 12/1997 | Dorman |
| 5,709,528 A | 1/1998 | Hablanian |
| 5,713,720 A | 2/1998 | Barhoum |
| 5,720,799 A | 2/1998 | Hays |
| 5,750,040 A | 5/1998 | Hays |
| 5,775,882 A | 7/1998 | Kiyokawa et al. |
| 5,779,619 A | 7/1998 | Borgstrom et al. |
| 5,795,135 A | 8/1998 | Nyilas et al. |
| 5,800,092 A | 9/1998 | Nill et al. |
| 5,848,616 A | 12/1998 | Vogel et al. |
| 5,850,857 A | 12/1998 | Simpson |
| 5,853,585 A | 12/1998 | Nesseth |
| 5,863,023 A | 1/1999 | Evans et al. |
| 5,899,435 A | 5/1999 | Mitsch et al. |
| 5,935,053 A | 8/1999 | Strid |
| 5,938,803 A | 8/1999 | Dries |

| Patent | Date | Name |
|---|---|---|
| 5,938,819 A | 8/1999 | Seery |
| 5,946,915 A | 9/1999 | Hays |
| 5,951,066 A | 9/1999 | Lane et al. |
| 5,965,022 A | 10/1999 | Gould |
| 5,967,746 A | 10/1999 | Hagi et al. |
| 5,971,702 A | 10/1999 | Afton et al. |
| 5,971,907 A | 10/1999 | Johannemann et al. |
| 5,980,218 A | 11/1999 | Takahashi et al. |
| 5,988,524 A | 11/1999 | Odajima et al. |
| 6,035,934 A | 3/2000 | Stevenson et al. |
| 6,059,539 A | 5/2000 | Nyilas et al. |
| 6,068,447 A | 5/2000 | Foege |
| 6,090,174 A | 7/2000 | Douma et al. |
| 6,090,299 A | 7/2000 | Hays et al. |
| 6,113,675 A | 9/2000 | Branstetter |
| 6,122,915 A | 9/2000 | Hays |
| 6,123,363 A | 9/2000 | Burgard et al. |
| 6,145,844 A | 11/2000 | Waggott |
| 6,149,825 A | 11/2000 | Gargas |
| 6,151,881 A | 11/2000 | Ai et al. |
| 6,190,261 B1 * | 2/2001 | Powell .................. 464/170 |
| 6,196,962 B1 | 3/2001 | Purvey et al. |
| 6,206,202 B1 | 3/2001 | Galk et al. |
| 6,214,075 B1 | 4/2001 | Filges et al. |
| 6,217,637 B1 | 4/2001 | Toney et al. |
| 6,227,379 B1 | 5/2001 | Nesseth |
| 6,257,985 B1 * | 7/2001 | Ward et al. ................ 464/80 |
| 6,277,278 B1 | 8/2001 | Conrad et al. |
| 6,312,021 B1 | 11/2001 | Thomas |
| 6,314,738 B1 | 11/2001 | Hays |
| 6,372,006 B1 | 4/2002 | Pregenzer et al. |
| 6,375,437 B1 | 4/2002 | Nolan |
| 6,383,262 B1 | 5/2002 | Marthinsen et al. |
| 6,394,764 B1 | 5/2002 | Samurin |
| 6,398,521 B1 * | 6/2002 | Yorulmazoglu .............. 417/360 |
| 6,398,973 B1 | 6/2002 | Saunders et al. |
| 6,402,465 B1 | 6/2002 | Maier |
| 6,426,010 B1 | 7/2002 | Lecoffre et al. |
| 6,464,469 B1 | 10/2002 | Grob et al. |
| 6,467,988 B1 | 10/2002 | Czachor et al. |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders et al. |
| 6,537,035 B2 | 3/2003 | Shumway |
| 6,540,917 B1 | 4/2003 | Richards et al. |
| 6,547,037 B2 | 4/2003 | Kuzdzal |
| 6,592,654 B2 | 7/2003 | Brown |
| 6,596,046 B2 | 7/2003 | Conrad et al. |
| 6,599,086 B2 | 7/2003 | Soja |
| 6,607,348 B2 | 8/2003 | Jean |
| 6,616,719 B1 | 9/2003 | Sun et al. |
| 6,617,731 B1 | 9/2003 | Goodnick |
| 6,629,825 B2 | 10/2003 | Stickland et al. |
| 6,631,617 B1 | 10/2003 | Dreiman et al. |
| 6,658,986 B2 | 12/2003 | Pitla et al. |
| 6,659,143 B1 | 12/2003 | Taylor et al. |
| 6,669,845 B2 | 12/2003 | Klass |
| 6,688,802 B2 | 2/2004 | Ross et al. |
| 6,707,200 B2 | 3/2004 | Carroll et al. |
| 6,718,955 B1 | 4/2004 | Knight |
| 6,719,830 B2 | 4/2004 | Illingworth et al. |
| 6,764,284 B2 | 7/2004 | Oehman, Jr. |
| 6,776,812 B2 | 8/2004 | Komura et al. |
| 6,802,693 B2 | 10/2004 | Reinfeld et al. |
| 6,802,881 B2 | 10/2004 | Illingworth et al. |
| 6,811,713 B2 | 11/2004 | Arnaud |
| 6,817,846 B2 | 11/2004 | Bennitt |
| 6,837,913 B2 | 1/2005 | Schilling et al. |
| 6,843,836 B2 | 1/2005 | Kitchener |
| 6,878,187 B1 | 4/2005 | Hays et al. |
| 6,893,208 B2 | 5/2005 | Frosini et al. |
| 6,907,933 B2 | 6/2005 | Choi et al. |
| 6,979,358 B2 | 12/2005 | Ekker |
| 7,001,448 B1 | 2/2006 | West |
| 7,013,978 B2 | 3/2006 | Appleford et al. |
| 7,022,150 B2 | 4/2006 | Borgstrom et al. |
| 7,022,153 B2 | 4/2006 | McKenzie |
| 7,025,890 B2 | 4/2006 | Moya |
| 7,033,410 B2 | 4/2006 | Hilpert et al. |
| 7,033,411 B2 | 4/2006 | Carlsson et al. |
| 7,056,363 B2 | 6/2006 | Carlsson et al. |
| 7,063,465 B1 | 6/2006 | Wilkes et al. |
| 7,112,036 B2 | 9/2006 | Lubell et al. |
| 7,131,292 B2 | 11/2006 | Ikegami et al. |
| 7,144,226 B2 | 12/2006 | Pugnet et al. |
| 7,159,723 B2 | 1/2007 | Hilpert et al. |
| 7,160,518 B2 | 1/2007 | Chen et al. |
| 7,169,305 B2 | 1/2007 | Gomez |
| 7,185,447 B2 | 3/2007 | Arbeiter |
| 7,204,241 B2 | 4/2007 | Thompson et al. |
| 7,241,392 B2 | 7/2007 | Maier |
| 7,244,111 B2 | 7/2007 | Suter et al. |
| 7,258,713 B2 | 8/2007 | Eubank et al. |
| 7,270,145 B2 | 9/2007 | Koezler |
| 7,288,202 B2 | 10/2007 | Maier |
| 7,314,560 B2 | 1/2008 | Yoshida et al. |
| 7,323,023 B2 | 1/2008 | Michele et al. |
| 7,328,749 B2 | 2/2008 | Reitz |
| 7,335,313 B2 | 2/2008 | Moya |
| 7,377,110 B2 | 5/2008 | Sheridan et al. |
| 7,381,235 B2 | 6/2008 | Koene et al. |
| 7,396,373 B2 | 7/2008 | Lagerstedt et al. |
| 7,399,412 B2 | 7/2008 | Keuschnigg |
| 7,435,290 B2 | 10/2008 | Lane et al. |
| 7,445,653 B2 | 11/2008 | Trautmann et al. |
| 7,470,299 B2 | 12/2008 | Han et al. |
| 7,473,083 B2 | 1/2009 | Oh et al. |
| 7,479,171 B2 | 1/2009 | Cho et al. |
| 7,494,523 B2 | 2/2009 | Oh et al. |
| 7,501,002 B2 | 3/2009 | Han et al. |
| 7,520,210 B2 | 4/2009 | Theodore, Jr. et al. |
| 7,575,422 B2 | 8/2009 | Bode et al. |
| 7,578,863 B2 | 8/2009 | Becker et al. |
| 7,591,882 B2 | 9/2009 | Harazim |
| 7,594,941 B2 | 9/2009 | Zheng et al. |
| 7,594,942 B2 | 9/2009 | Polderman |
| 7,610,955 B2 | 11/2009 | Irwin, Jr. |
| 7,628,836 B2 | 12/2009 | Baronet et al. |
| 7,637,699 B2 | 12/2009 | Albrecht |
| 7,674,377 B2 | 3/2010 | Crew |
| 7,677,308 B2 | 3/2010 | Kollé |
| 7,708,537 B2 | 5/2010 | Bhatia et al. |
| 7,708,808 B1 | 5/2010 | Heumann |
| 7,744,663 B2 | 6/2010 | Wallace |
| 7,748,079 B2 | 7/2010 | McDowell et al. |
| 7,766,989 B2 | 8/2010 | Lane et al. |
| 7,811,344 B1 | 10/2010 | Duke et al. |
| 7,811,347 B2 | 10/2010 | Carlsson et al. |
| 7,815,415 B2 | 10/2010 | Kanezawa et al. |
| 7,824,458 B2 | 11/2010 | Borgstrom et al. |
| 7,824,459 B2 | 11/2010 | Borgstrom et al. |
| 7,846,228 B1 | 12/2010 | Saaski et al. |
| 2001/0007283 A1 | 7/2001 | Johal et al. |
| 2002/0009361 A1 | 1/2002 | Reichert et al. |
| 2003/0029318 A1 | 2/2003 | Firey |
| 2003/0035718 A1 | 2/2003 | Langston et al. |
| 2003/0136094 A1 | 7/2003 | Illingworth et al. |
| 2004/0007261 A1 | 1/2004 | Cornwell |
| 2004/0170505 A1 | 9/2004 | Lenderink et al. |
| 2005/0173337 A1 | 8/2005 | Costinel |
| 2006/0065609 A1 | 3/2006 | Arthur |
| 2006/0090430 A1 | 5/2006 | Trautman et al. |
| 2006/0096933 A1 | 5/2006 | Maier |
| 2006/0157251 A1 | 7/2006 | Stinessen et al. |
| 2006/0157406 A1 | 7/2006 | Maier |
| 2006/0193728 A1 | 8/2006 | Lindsey et al. |
| 2006/0222515 A1 | 10/2006 | Delmotte et al. |
| 2006/0230933 A1 | 10/2006 | Harazim |
| 2006/0239831 A1 | 10/2006 | Garris, Jr. |
| 2006/0254659 A1 | 11/2006 | Ballot et al. |
| 2006/0275160 A1 | 12/2006 | Leu et al. |
| 2007/0029091 A1 | 2/2007 | Stinessen et al. |
| 2007/0036646 A1 | 2/2007 | Nguyen et al. |
| 2007/0051245 A1 | 3/2007 | Yun |
| 2007/0062374 A1 | 3/2007 | Kolle |
| 2007/0065317 A1 | 3/2007 | Stock |

| | | | |
|---|---|---|---|
| 2007/0084340 A1 | 4/2007 | Dou et al. | |
| 2007/0140870 A1 | 6/2007 | Fukanuma et al. | |
| 2007/0151922 A1 | 7/2007 | Mian | |
| 2007/0163215 A1 | 7/2007 | Lagerstadt | |
| 2007/0172363 A1 | 7/2007 | Laboube et al. | |
| 2007/0196215 A1 | 8/2007 | Frosini et al. | |
| 2007/0227969 A1 | 10/2007 | Dehaene et al. | |
| 2007/0294986 A1 | 12/2007 | Beetz et al. | |
| 2008/0031732 A1 | 2/2008 | Peer et al. | |
| 2008/0039732 A9 | 2/2008 | Bowman | |
| 2008/0246281 A1 | 10/2008 | Agrawal et al. | |
| 2008/0315812 A1 | 12/2008 | Balboul | |
| 2009/0013658 A1 | 1/2009 | Borgstrom et al. | |
| 2009/0015012 A1 | 1/2009 | Metzler et al. | |
| 2009/0025562 A1 | 1/2009 | Hallgren et al. | |
| 2009/0025563 A1 | 1/2009 | Borgstrom et al. | |
| 2009/0151928 A1 | 6/2009 | Lawson | |
| 2009/0159523 A1 | 6/2009 | McCutchen | |
| 2009/0169407 A1 | 7/2009 | Yun | |
| 2009/0173095 A1 | 7/2009 | Bhatia et al. | |
| 2009/0266231 A1 | 10/2009 | Franzen et al. | |
| 2009/0304496 A1 | 12/2009 | Maier | |
| 2009/0321343 A1 | 12/2009 | Maier | |
| 2009/0324391 A1 | 12/2009 | Maier | |
| 2010/0007133 A1 | 1/2010 | Maier | |
| 2010/0021292 A1 | 1/2010 | Maier et al. | |
| 2010/0038309 A1 | 2/2010 | Maier | |
| 2010/0043288 A1 | 2/2010 | Wallace | |
| 2010/0043364 A1 | 2/2010 | Curien | |
| 2010/0044966 A1 | 2/2010 | Majot et al. | |
| 2010/0072121 A1 | 3/2010 | Maier | |
| 2010/0074768 A1 | 3/2010 | Maier | |
| 2010/0083690 A1 | 4/2010 | Sato et al. | |
| 2010/0090087 A1 | 4/2010 | Maier | |
| 2010/0143172 A1 | 6/2010 | Sato et al. | |
| 2010/0163232 A1 | 7/2010 | Koll | |
| 2010/0183438 A1 | 7/2010 | Maier et al. | |
| 2010/0239419 A1 | 9/2010 | Maier et al. | |
| 2010/0239437 A1 | 9/2010 | Maier | |
| 2010/0247299 A1 | 9/2010 | Maier | |
| 2010/0257827 A1 | 10/2010 | Lane et al. | |
| 2011/0017307 A1 | 1/2011 | Kidd et al. | |
| 2011/0061536 A1 | 3/2011 | Maier et al. | |

FOREIGN PATENT DOCUMENTS

| | | |
|---|---|---|
| EP | 301285 | 10/1991 |
| EP | 1582703 | 10/2005 |
| EP | 2013479 | 1/2009 |
| EP | 7838631.5 | 12/2009 |
| GB | 2323639 | 9/1998 |
| GB | 2337561 | 11/1999 |
| JP | 54099206 | 1/1978 |
| JP | 08 068501 | 3/1996 |
| JP | 8-284961 A | 11/1996 |
| JP | 2002 242699 | 8/2002 |
| JP | 2004034017 A | 2/2004 |
| JP | 3711028 | 10/2005 |
| JP | 2005291202 | 10/2005 |
| KR | 2009085521 | 2/2008 |
| MX | 2008012579 | 12/2008 |
| WO | 9524563 | 9/1995 |
| WO | 0117096 | 3/2001 |
| WO | 2007043889 | 4/2007 |
| WO | 2007103248 | 9/2007 |
| WO | 2007120506 | 10/2007 |
| WO | 2008036221 | 3/2008 |
| WO | 2008039446 | 3/2008 |
| WO | 2008039491 | 4/2008 |
| WO | 2008039731 | 4/2008 |
| WO | 2008039732 | 4/2008 |
| WO | 2008039733 | 4/2008 |
| WO | 2008039734 | 4/2008 |
| WO | 2008036394 | 7/2008 |
| WO | 2009111616 | 9/2009 |
| WO | 2009158252 | 12/2009 |
| WO | 2009158253 | 12/2009 |
| WO | 2010083416 | 7/2010 |
| WO | 2010083427 | 7/2010 |
| WO | 2010107579 | 9/2010 |
| WO | 2010110992 | 9/2010 |
| WO | 2011034764 | 3/2011 |

OTHER PUBLICATIONS

Technical Manual—High Pressure Air Compressor Model 13NL45; Navsea S6220-AT-MMA-010/93236, pp. 3-23 to 3-32, Electric Boat Corporation, Groton, CT 06340, Oct. 28, 1991.
PCT/US2007/008149 International Preliminary Report on Patentability dated Sep. 30, 2008.
PCT/US2007/008149 International Search Report and Written Opinion dated Jul. 17, 2008.
PCT/US2007/020101 International Preliminary Report on Patentability dated Mar. 24, 2009.
PCT/US2007/020101 International Search Report dated Apr. 29, 2008.
PCT/US2007/020471 International Preliminary Report on Patentability dated Mar. 24, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 Written Opinion dated Jan. 29, 2008.
PCT/US2007/079352 International Preliminary Report on Patentability dated Mar. 31, 2009.
PCT/US2007/079352 International Search Report and Written Opinion dated Aug. 27, 2008.
PCT/US2009/036142 International Preliminary Report on Patentability dated Sep. 16, 2010.
PCT/US2009/036142 Written Opinion dated May 11, 2009.
PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.
PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.
PCT/US2010/025952 International Report on Patentability dated Mar. 14, 2011.

PCT/US2009/047667 International Report on Patentability dated Jan. 13, 2011.
PCT/US2009/047667 Written Opinion dated Aug. 7, 2009.
PCT/US2007/020101 Written Opinion dated Mar. 19, 2009.
PCT/US2007/079350 International Search Report dated Jul. 17, 2008.
PCT/US2009/036142 International Search Report dated Jan. 7, 2010.
PCT/US2009/047667 International Search Report dated Dec. 30, 2009.

* cited by examiner

ACCESS COVER FOR PRESSURIZED CONNECTOR SPOOL

CROSS REFERENCE

This application is a United States national phase application of co-pending international patent application number PCT/US2007/079348, filed Sep. 25, 2007; which claims priority to U.S. Provisional Patent Application No. 60/826,801, filed Sep. 25, 2006, the disclosures of which are incorporated herein by reference.

BACKGROUND

The present invention relates to connection members for components of an industrial compression system and, more particularly, to an access cover arrangement for a connector spool between a motor casing and a compressor casing.

SUMMARY

In one embodiment, the invention provides a connector spool for connecting a compressor casing to a drive casing of an industrial compression system. The connector spool includes a spool body having a substantially cylindrical shape, the body having a first end coupled to the compressor casing and a second end coupled to the drive casing. The body defines an interior region and access ports are formed in the body for providing access to the interior region. The connector spool also includes a hoop-shaped pressurized member for covering the access ports.

In another embodiment, the invention provides a connector spool including a spool body having a substantially cylindrical shape, the body coupling the compressor casing to the drive casing and defining an interior region. Access ports are formed in the body for providing access to the interior region of the body, a cover covers each the access ports to permit pressurizing of the interior region of the body.

In yet another embodiment, the invention provides a connector spool for connecting a compressor casing to a drive casing of an industrial compression system. The connector spool includes a spool body having a substantially cylindrical shape, the body coupling the compressor casing to the drive casing and defining an interior region. Access ports are formed in the body for providing access to the interior region of the body and sealing members are provided on an exterior surface of the body with each sealing member substantially surrounding one of the access ports. The connector spool also includes a plurality of covers, each cover covering one of the access ports to permit pressurizing of the interior region of the body. Each cover is formed as an arc segment, and includes an inner circumferential surface for mating with an outer circumferential surface of the body. In addition, each cover includes radially extending flanges at each circumferential end of the cover. Fastening means couple adjacent covers together at the adjacent flanges, thereby forming a hoop-shaped pressurizing member to provide a sealing relationship with the sealing members to seal the access ports.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

For example, terms like "central", "upper", "lower", "front", "rear", and the like are only used to simplify description of the present invention, and do not alone indicate or imply that the device or element referred to must have a particular orientation. The elements of the pressurized connector spool referred to in the present invention can be installed and operated in any orientation desired. In addition, terms such as "first", "second", and "third" are used herein for the purpose of description and are not intended to indicate or imply relative importance or significance.

DETAILED DESCRIPTION

Figure 1:
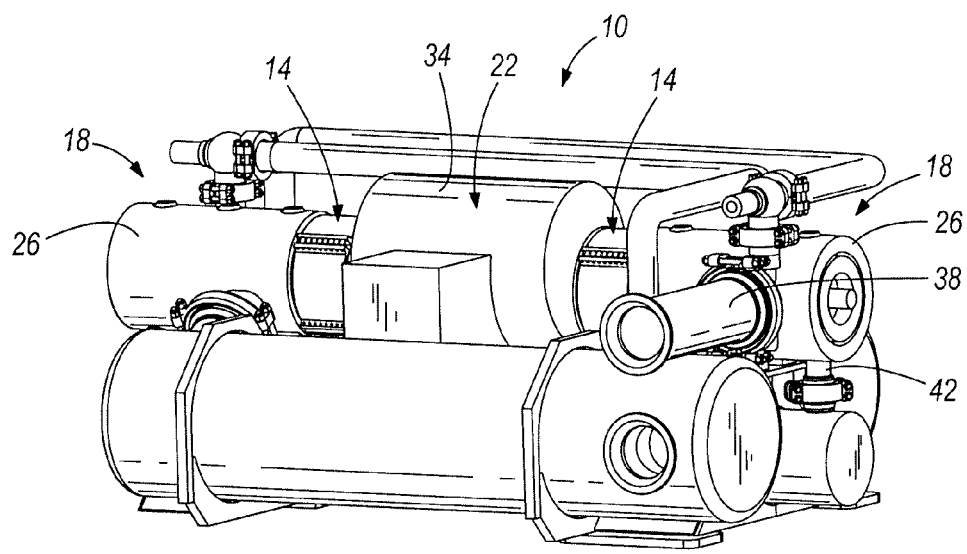
FIG. 1 is a perspective view of an industrial compression system incorporating one embodiment of the invention.

FIG. 1 illustrates an industrial compression system 10 including connection means, that is connector spools 14, according to one embodiment of the invention. Industrial compression systems 10 are used in industry to compress gases or fluids for industrial purposes. The system 10 might, for example, be used on an oil production platform. The industrial compression system 10 includes two compressors 18 close-coupled to a double-ended electric motor driver 22. This arrangement allows for a compact design with significant benefits over more traditional base-plate mounted compressor trains.

Each compressor 18 is surrounded by a cylindrical compressor casing 26 and the motor 22 is surrounded by a cylindrical motor casing 34. The motor casing 34 and the compressor casings 26 are separate bodies that are positioned to facilitate installation and service. An important problem with service activity is the time and cost required to disconnect piping and instrumentation connected to each casing 26, 34. Individual casing removal is especially problematic for applications where the unit has compressor casings 26 at each end and a double ended motor driver 22 in between, as shown in FIG. 1. The connector spools 14 provide an assembly configuration that allows each of the motor casing 34 and the compressor casings 26 to be removed individually with minimum disturbance to other casings in a combined unit.

Figure 2:
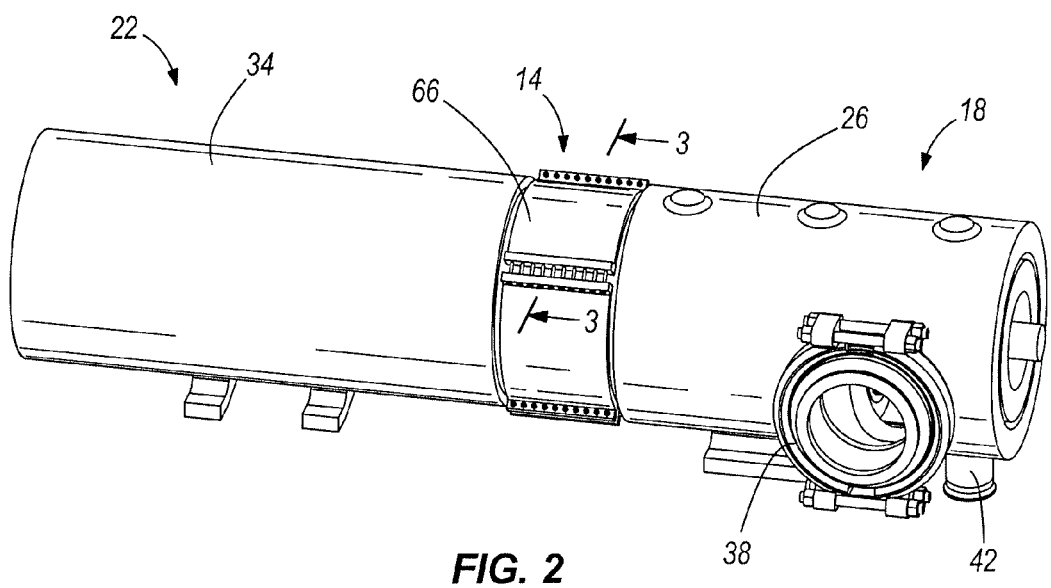
FIG. 2 is a perspective view of a motor casing, a connector spool, and a compressor casing of the industrial compressor system shown in FIG. 1.

Referring to FIGS. 1 and 2, the compressor 18 includes a compressor inlet 38 and a compressor outlet 42. The compressor inlet 38 takes in a fluid or a gas to be compressed and after compression, discharges it through the outlet 42. Location and size of the inlet 38 and the outlet 42 can be widely varied as a matter of choice by the system designer.

Figure 3:
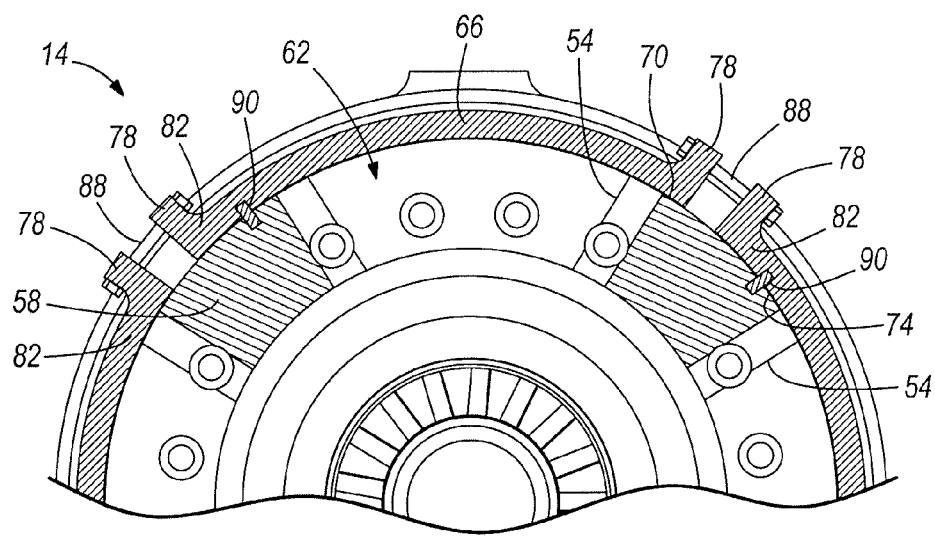
FIG. 3 is a section view of the connector spool taken along line 3-3 of FIG. 2.
Figure 4:
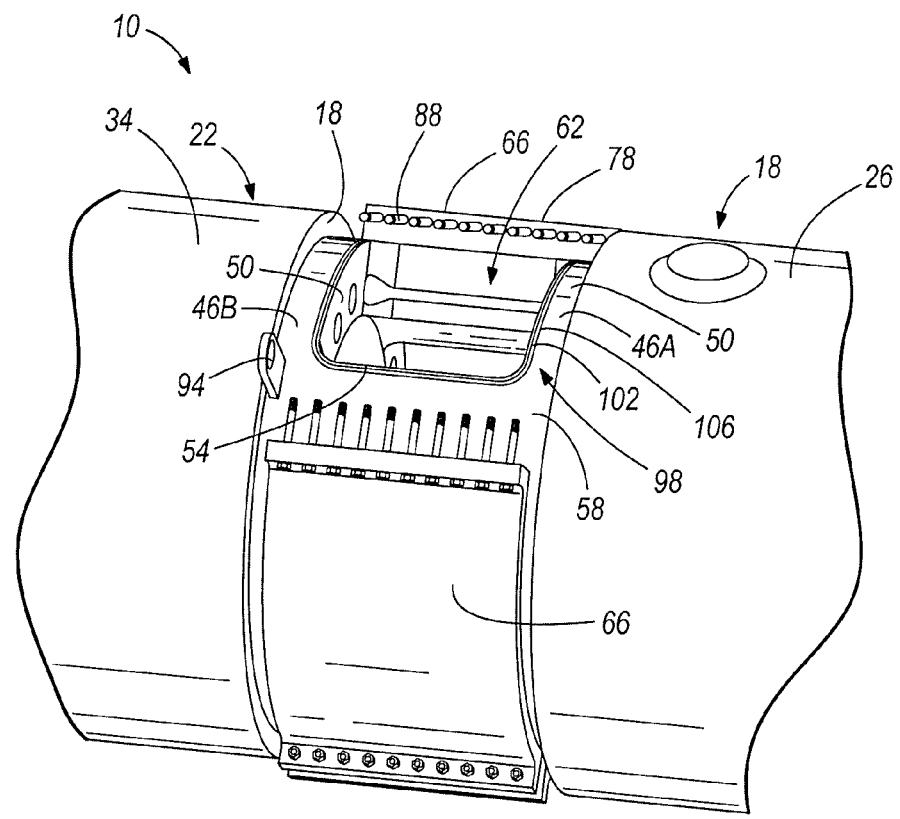
FIG. 4 is a perspective view of the connector spool with an access cover removed.

In the system shown in FIG. 1, the motor 22 is double ended in order to drive two compressors 18, one on each side of the motor 22. A connector spool 14 is mounted at each end of the motor 22. Other forms of industrial compression systems may have a single connector spool or multiple of connector spools, depending on the number of motors and compressors and the configuration of the system. An embodiment of the connector spool 14 is shown in FIGS. 2-4, which show the connector spool 14 coupled between the cylindrical motor casing 34 and the cylindrical compressor casing 26. The connector spool 14 provides a pressurized housing for a mechanical drive connection between the compressor 18 and the motor 22. The connector spool 14 has a hollow cylindrical body or "outer casing" 58 with flanges 50 at the axial ends 46A, 46B. The flanges 50 have aligned outer radial surfaces for mating inner radial surfaces on the compressor and motor casings 26, 34. The flanges 50 keep the connector spool 14, the compressor casing 26 and the motor casing 34 aligned with respect to a rotational centerline of the compression system 10.

In the industrial compression system 10 it is necessary to gain access to internal components within the connector spool 14 such as a drive coupling between the compressor 18 and the motor 22. The connector spool 14 includes multiple large access ports 54 formed in the outer casing 58 of the connector spool 14. It can be readily appreciated that the connector spool outer casing 58 is a structurally critical component in connecting the motor 22 to the compressor 18 in a manner that is both structurally sound and permits pressurizing of an interior region 62 of the spool 14. While the connector spool 14 is structurally capable of handling large loads during operation as a connecting member between two major operational components, it also provides useable access to the interior region 62 for maintenance and repair of the system 10. The access ports 54 permit maintenance personnel to gain access to the interior region 62 with freedom of movement and room for tools or various other items used for maintaining the system 10.

In the close-coupled industrial compression system 10 shown in FIG. 1, the connector spool 14 runs at elevated pressure. The access covers 66 and attachment method described herein allow relatively easy access to the interior region 62 of the spool 14 (as shown in FIG. 4), while maintaining gas tight sealing under typical operating conditions.

Figure 5:
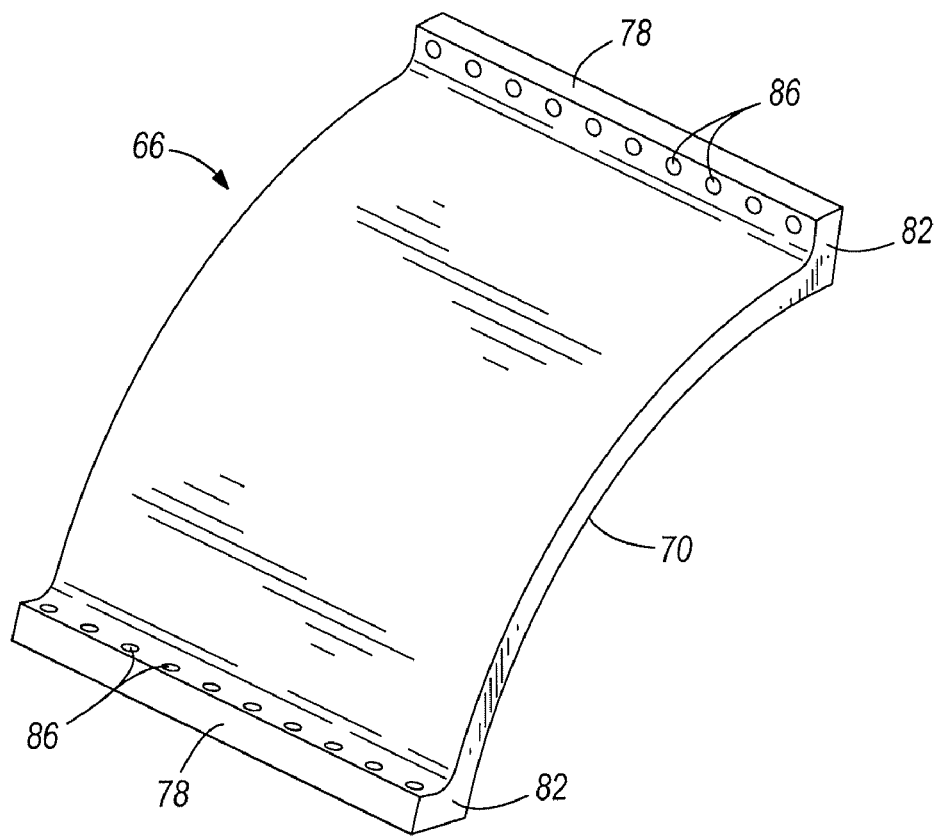
FIG. 5 is a perspective view of the access cover.

Referring to FIGS. 2-4, multiple circumferentially connected access covers 66 provide covering and pressure containment of the access ports 54. Referring to FIGS. 3 and 5, the covers 66 are formed as extruded arc segments. Each cover 66 includes an inner circumferential surface 70 that matches or mates with an outer circumferential surface 74 of the outer casing 58 of the spool 14. A radially extending flange 78 is formed on each circumferential end 82 of the access cover 66. In the illustrated embodiment, the flange 78 is a bolt flange and includes apertures 86 therein. The bolt flanges 78 allow the cover 66 to be connected or bolted by fasteners 88, such as bolts, to adjacent covers 66 to function as a hoop-shaped pressurizing member. The access covers 66 may be disassembled by first unbolting them on each circumferential end 82 and then lifting them radially away from the connector spool 14. It should be readily apparent to those of skill in the art that other means may be used for positioning the covers 66 and attaching them together, such as, but not limited to, clamps, slots and slot members, circumferential bands, or similar such positioning members.

Radially extending bolt flanges 78 are positioned at opposite ends 82 of each access cover 66 to provide a surface for circumferential fastening or bolting of adjacent covers 66, which provides hoop-shaped pressurizing member for pressure sealing of the access ports 54. It is generally contemplated that fastening the access covers 66 together will form a pressurized seal and will also hold the separate covers 66 in position.

In one embodiment, means are provided to position access covers 66 while one or more of the covers 66 are being installed or removed. A cover positioning member 90 may be located on the connector spool outer casing 58. Referring to FIG. 3, the positioning member 90 includes a flange extending radially from the outer surface 74 of the spool casing 58. The inner surface 70 of the cover 66 receives the flange 90 to position the cover 66 relative to the respective access port 54. In the illustrated embodiment, the positioning member 90 is located in a region outside a sealing member region, discussed below. In a further embodiment, the positioning member 90 may be one or more radial bolts extending from the cover 66 into the outer casing 58. Referring to FIG. 4, one embodiment includes one or more radial fasteners 94, such as a bracket, positioned on the outer casing 58 for securing the access covers 66 during maintenance, assembly or disassembly.

The industrial compression system 10 operates at pressures substantially greater than atmospheric or ambient pressure. Therefore, a sealing arrangement around the access ports 54 prevents the escape of pressurized gases inside the connector spool 14. In the illustrated embodiment, a sealing member 98 between the access covers 66 and the access ports 54 includes an O-ring, 102 as shown in FIG. 4. It should be readily apparent to those of skill in the art that various other sealing means or members may be employed. Referring to FIG. 4, a groove 106 substantially surrounds each access port 54. The groove 106 is formed (e.g., machined) in the connector spool outer casing 58 and has sufficient width and depth to accept and position the O-ring 102 therein. The sealing member 98 is used around each access port 54 on the outer casing 58. In FIG. 4, a single O-ring 102 and groove 106 is used for each port 54. In another embodiment, multiple sealing grooves or elements may be positioned around each access port 54. In a further embodiment, a raised boundary that fits into a mating trench on the cover 66 may be used as a sealing member (not shown).

A thickness of the access cover 66 is determined, at least in part, by hoop stress limitations and O-ring seal deflection limits. The cover thickness is sufficient to withstand stresses occurring in the connector spool 14, including torque, vibration, hoop stress and various other forces.

In the illustrated embodiment, the connector spool 14 includes four equally spaced access ports 54. In a further embodiment, the access ports 54 may be unevenly spaced or include fewer or more ports. The remaining connector spool material circumferentially arrayed between the ports 54 should provide sufficient axial and bending stiffness and strength to withstand and resist various forces in the industrial compression system 10. Also, sufficient space is provided for the sealing members 98, in the region immediately adjacent to the access ports 54, while the access ports 54 are sufficiently large to permit access for proper maintenance. In a further embodiment, the number of access ports 54 does not equal the number of access covers 66. However, each sealing member 98 should be sufficiently covered by an access cover 66 to prevent leakage. It is envisioned that the covers 66 extend substantially around the connector spool 14, thereby forming a pressurized hoop member thereround.

In yet another embodiment, an anti-rotation device (not shown), such as a bolt or pin, engages the connector spool 14 and the access covers 66. The anti-rotation device maintains circumferential orientation and limits circumferential movement of the access covers 66 to prevent improper movement or clocking with respect to the connector spool outer casing 58 or the sealing members 98.

It should be readily apparent to those of skill in the art that the access cover may be used with various driver and driven equipment. For example, drivers include, but are not limited to, a motor, a turbine or an internal combustion engine, and driven equipment includes, but is not limited to, a compressor, a generator, or a pump.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Since other modifications, changes and substitutions are intended in the foregoing disclosure, it is appropriate that the appended claims be construed broadly and in a manner consistent with the scope of the invention.

What is claimed is:

1. A connector spool, comprising:
a substantially inflexible, cylindrical spool body having an interior region defined therein and a first end coupled to a casing;
an access port formed in the cylindrical spool body, the access port being configured to provide access therethrough to the interior region; and
a cover disposed against the cylindrical spool body, sealingly covering the access port with a fluid tight seal, and comprising a first arc segment and a second arc segment coupled to the first arc segment.

2. The connector spool of claim 1, wherein the access port comprises a first opening and a second opening that is spaced apart from the first opening around the cylindrical spool body.

3. The connector spool of claim 2, wherein the first arc segment at least partially covers the first opening, and the second arc segment at least partially covers the second opening.

4. The connector spool of claim 1, wherein:
the first arc segment comprises a first end and a first flange located at the first end of the first arc segment; and
the second arc segment comprises a second end and a second flange located at the second end and fastened to the first flange.

5. The connector spool of claim 1, wherein the cover is hoop-shaped and disposed around the cylindrical spool body.

6. The connector spool of claim 1, further comprising a radial fastener coupled to the cylindrical spool body and the cover, for securing the cover to the cylindrical spool body.

7. The connector spool of claim 1, further comprising a positioning member extending radially from the cylindrical spool body and engaging the cover.

8. The connector spool of claim 7, wherein:
the cover defines a positioning slot therein; and
the positioning member comprises a positioning flange fixed to the cylindrical spool body and received into the positioning slot.

9. An apparatus, comprising:
a first casing;
a second casing; and
a first substantially rigid connector spool connected to the first and second casings and comprising:
a first spool body defining a first internal region therein and having a first access port configured to provide access therethrough to the first internal region; and
a first cover disposed around the first spool body, sealingly engaging the first spool body with a fluid tight seal, and comprising a plurality of first arc segments each coupled to at least another one of the plurality of first arc segments.

10. The apparatus of claim 9, wherein each of the plurality of first arc segments comprises a flange, wherein the flange of each of the plurality of first arc segments is removably connected to the flange of another one of the plurality of first arc segments.

11. The apparatus of claim 9, wherein the first connector spool further comprises a sealing member disposed between the first spool body and the first cover.

12. The apparatus of claim 11, wherein the first spool body defines a groove around the first access port, and the sealing member is at least partially disposed in the groove.

13. The apparatus of claim 9, wherein:
the first cover defines a positioning slot formed therein; and
the first connector spool further comprises a positioning flange extending radially outward from and fixed to the first spool body and received into the positioning slot.

14. The apparatus of claim 9, wherein the first connector spool further comprises a radial fastener coupled to the first spool body and the first cover.

15. The apparatus of claim 14, wherein the radial fastener comprises a bracket fixed to the first spool body and removably coupled to the first cover.

16. The apparatus of claim 9, wherein:
the first access port comprises a plurality of openings spaced apart around the first spool body; and
each of the plurality of first arc segments at least partially covers at least one of the plurality of openings.

17. The apparatus of claim 16, wherein the first connector spool further comprises a plurality of sealing members each disposed around at least one of the plurality of openings and between the first spool body and the first cover.

18. The apparatus of claim 9, further comprising a first compressor disposed in the first casing, and a motor disposed in the second casing.

19. The apparatus of claim 18, further comprising:
a third casing;
a second compressor disposed in the third casing; and
a second connector spool connected to the second and third casings and comprising:
a second spool body defining a second internal region therein and having a second access port; and
a second cover disposed around the second spool body, sealingly engaging the second spool body, and comprising a plurality of second arc segments each connected to at least another one of the plurality of second arc segments.

20. A connector spool for connecting a first casing to a second casing, comprising:
a rigid spool body defining an interior region therein and having a first end coupled to the first casing and a second end coupled to the second casing;
a plurality of access ports each defined in the spool body and circumferentially spaced apart, the plurality of access ports being configured to provide access therethrough to the interior region;
an access cover sealingly disposed around the spool body and comprising a plurality of arc segments each fastened to at least another one of the plurality of arc segments;
a positioning flange fixed to the spool body and engaging the cover, for maintaining a position of the cover; and
a compressible sealing member disposed between the spool body and the access cover.

* * * * *